(12) United States Patent
Park

(10) Patent No.: US 9,085,466 B2
(45) Date of Patent: Jul. 21, 2015

(54) METHOD FOR PRODUCING PRECIPITATED CALCIUM CARBONATE USING FOWL EGG SHELLS

(75) Inventor: Kyoung-Won Park, Ulsan (KR)

(73) Assignee: Essentron Co., Ltd., Wonnam-myeon (KR)

(*) Notice: Subject to any disclaimer, the term of this patent is extended or adjusted under 35 U.S.C. 154(b) by 113 days.

(21) Appl. No.: 14/007,103

(22) PCT Filed: Mar. 16, 2012

(86) PCT No.: PCT/KR2012/001895
§ 371 (c)(1),
(2), (4) Date: Nov. 4, 2013

(87) PCT Pub. No.: WO2012/134081
PCT Pub. Date: Oct. 4, 2012

(65) Prior Publication Data
US 2014/0044620 A1    Feb. 13, 2014

(30) Foreign Application Priority Data

Mar. 25, 2011 (KR) .................... 10-2011-0026681

(51) Int. Cl.
C01F 11/18 (2006.01)
C04B 2/04 (2006.01)
C04B 2/10 (2006.01)

(52) U.S. Cl.
CPC ............... *C01F 11/184* (2013.01); *C01F 11/18* (2013.01); *C01F 11/185* (2013.01); *C04B 2/04* (2013.01); *C04B 2/045* (2013.01); *C04B 2/10* (2013.01); *C01P 2002/72* (2013.01); *C01P 2004/03* (2013.01); *C01P 2004/62* (2013.01)

(58) Field of Classification Search
CPC .................................................. C01F 11/18
See application file for complete search history.

(56) References Cited

FOREIGN PATENT DOCUMENTS

| JP | 2002-87815 | 3/2002 |
| KR | 10-2001-0083819 | 9/2001 |
| KR | 2001-0088513 | 9/2001 |

OTHER PUBLICATIONS

International Search Report issued Oct. 12, 2012 in corresponding International Patent Application No. PCT/KR2012/001895 (8 pages, both in Korean with English Translation).
Technical Development Trend on Synthesis of Precipitated Calcium Carbonate, KISTI TechTrends Report; (Nov. 27, 2003) (Total 47 pages in Korean, pp. 21 and 26).
Technical Development Trend on Synthesis of Precipitated Calcium Carbonate, KISTI TechTrends Report; (Nov. 27, 2003) (36 pages English Language translation).

*Primary Examiner* — Stuart Hendrickson
(74) *Attorney, Agent, or Firm* — NSIP Law

(57) ABSTRACT

The present invention relates to a method for producing precipitated calcium carbonate using fowl egg shells such as chicken egg shells. More particularly, the method comprises: a heat treatment step of heating fowl egg shells; a grinding step of grinding calcium oxide generated in the heat treatment step; a dry-quenching step of feeding the ground calcium oxide into a thermo-hygrostat to convert the ground calcium oxide into dry calcium hydroxide powder; a carbonizing step of mixing the dry calcium hydroxide powder prepared in the dry-quenching step with an organic solvent and feeding carbon dioxide generated in the heat treatment step into the mixture; and a filtering and drying step of filtering and drying the calcium carbonate obtained in the carbonizing step.

7 Claims, 10 Drawing Sheets

METHOD FOR PRODUCING PRECIPITATED CALCIUM CARBONATE USING FOWL EGG SHELLS

CROSS-REFERENCE TO RELATED APPLICATIONS

This application is a National Stage of International Application No. PCT/KR2012/001895, filed Mar. 16, 2012 and published as WO 2012/134081 A2 on Oct. 4, 2012, which claims the benefit of Korean Patent Application No. 10-2011-0026681, filed on Mar. 25, 2011, the entire disclosures of which are incorporated herein by reference for all purposes.

TECHNICAL FIELD

The present invention relates to a method of producing precipitated calcium carbonate using fowl egg shells. More particularly, the method comprises a heat treatment step, a grinding step, a dry-quenching step, a carbonizing step, and a filtering and drying step.

BACKGROUND ART

The present invention relates to a method of producing precipitated calcium carbonate using fowl egg shells. More particularly, the method comprises a heat treatment step, a grinding step, a dry-quenching step, a carbonizing step, and a filtering and drying step.

During the past several decades, there has been an industrial demand for calcareous products that continues to expand. Such calcareous products are largely classified into ground calcium carbonate directly obtained by grinding limestone and precipitated calcium carbonate prepared by a chemical method.

In contrast to the ground calcium carbonate that is uneven in the shape of particles, the precipitated calcium carbonate are composed of extremely small particles uniform in shape and thus considered as a high value-added material useful in the fields of household items, such as paints, toothpaste, or stationery, foods, and medical substances, as well as in the field of fine synthetic chemistry, such as paper, plastic, rubber, etc.

The development of mineral resources such as calcium carbonate has recently encountered some difficulties due to high cost for development and a rising attention to environmental preservation. Particularly, the conventional precipitated calcium carbonate is prepared primarily through synthesis of materials in the form of limestone. Limestone, however, varies a lot in quality according to the place of production, which leads to the need of performing additional pretreatment and synthesis processes and thus increases the production cost.

Moreover, limestone has a large grain size number and a dense structure and thus exhibits low thermal dissociation rate. Heat transfer is poor through pores in the coarse limestone, and carbon dioxide generated from thermal dissociation has the difficulty in escaping from the dense structure of limestone through the dense structure of limestone. Thus, the partial pressure of carbon dioxide increases relatively on the interface where thermal dissociation occurs, making the thermal dissociation rate lower. This causes the need for heat treatment at high temperature and hence leads to an increase in the production cost.

Further, the precipitated calcium carbonate prepared using limestone contains a large amount of impurities. And, carbon dioxide generated during the pretreatment process for limestone causes environmental contamination.

DISCLOSURE OF INVENTION

Technical Problem

It is an object of the present invention to provide a method for producing calcium carbonate using fowl egg shells that uses flow egg shells such as chicken egg shells as a waste, removing the need for additional pretreatment processes and simplifies the synthetic process to ensure low production cost.

It is another object of the present invention to provide a method for producing calcium carbonate using fowl egg shells that enables it to control the particle size with ease and produce precipitated calcium carbonate with high purity.

It is further another object of the present invention to provide a method for producing precipitated calcium carbonate using fowl egg shells that recycles the carbon dioxide generated during the heat treatment process to prevent environmental contamination.

Technical Solution

To achieve the one object of the present invention, there is provided a method for producing precipitated calcium carbonate using fowl egg shells, comprising: a heat treatment step of heating fowl egg shells; a grinding step of grinding calcium oxide generated in the heat treatment step; a dry-quenching step of feeding the ground calcium oxide into a thermo-hygrostat to convert the ground calcium oxide into dry calcium hydroxide powder; a carbonizing step of mixing the dry calcium hydroxide powder prepared in the dry-quenching step with an organic solvent and feeding carbon dioxide generated in the heat treatment step into the mixture; and a filtering and drying step of filtering and drying the calcium carbonate obtained in the carbonizing step.

In a preferred aspect of the present invention, the heat treatment step includes heating the fowl egg shells at 580 to 780° C. for 1 to 60 minutes.

In another preferred aspect of the present invention, the grinding step is achieved by using one grinding apparatus selected from the group consisting of ball mill, disc mill, and impact mill.

In still another preferred aspect of the present invention, the dry-quenching step includes exposing the ground calcium oxide to atmospheric air for 1 to 15 days to absorb moisture and then placing the water-absorbing calcium oxide in a thermo-hygrostat maintained in the humidity range of 30 to 95% for 30 to 120 minutes to convert the ground calcium oxide into dry calcium hydroxide powder.

In still further another preferred aspect of the present invention, the carbonizing step includes feeding 2 to 25 parts by weight of the dry calcium hydroxide powder and 75 to 100 parts by weight of an organic solvent into a reactor and then adding the carbon dioxide generated from the heat treatment step into the reactor at a rate of 450 to 550 cc/min.

In still further another preferred aspect of the present invention, the drying and filtering step includes filtering the precipitated calcium carbonate generated from the carbonizing step through a rotary atomizer and then drying with a hot-air drier.

In still further another preferred aspect of the present invention, the method further comprises a calcium hydroxide coating step between the dry-quenching step and the carbonizing step, where the calcium hydroxide coating step includes feeding 25 parts by weight of the dry calcium hydroxide powder produced in the dry-quenching step, 25 to 50 parts by weight of distilled water, 25 to 50 parts by weight of methanol, 1 to 5 parts by weight of a rubber component, and 1 to 5 parts by weight of an agar liquid into a high-pressure reactor, stirring in the supercritical region under conditions of 32° C. and 74 bar for 30 minutes, and then filtering through a 300- to-400 mesh sieve.

Advantageous Effects

The method for producing calcium carbonate using fowl egg shells according to the present invention uses flow egg shells obtained as a waste to remove the need for additional pretreatment processes and simplifies the synthetic process to ensure low production cost.

Further, the method enables it to control the particle size with ease and produce precipitated calcium carbonate with high purity.

Further, the method recycles the carbon dioxide generated during the heat treatment process in the carbonizing step to avoid occurrence of environmental contamination.

BRIEF DESCRIPTION OF ACCOMPANIED DRAWINGS

Figure 1:
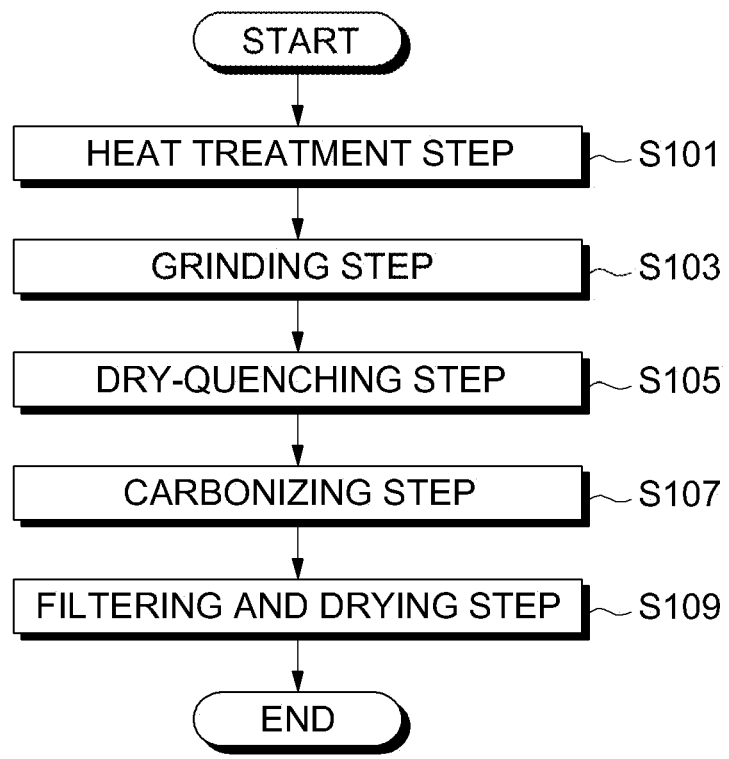
FIG. 1 is a flow chart showing a method for producing precipitated calcium carbonate using fowl egg shells according to one embodiment of the present invention.
Figure 2:
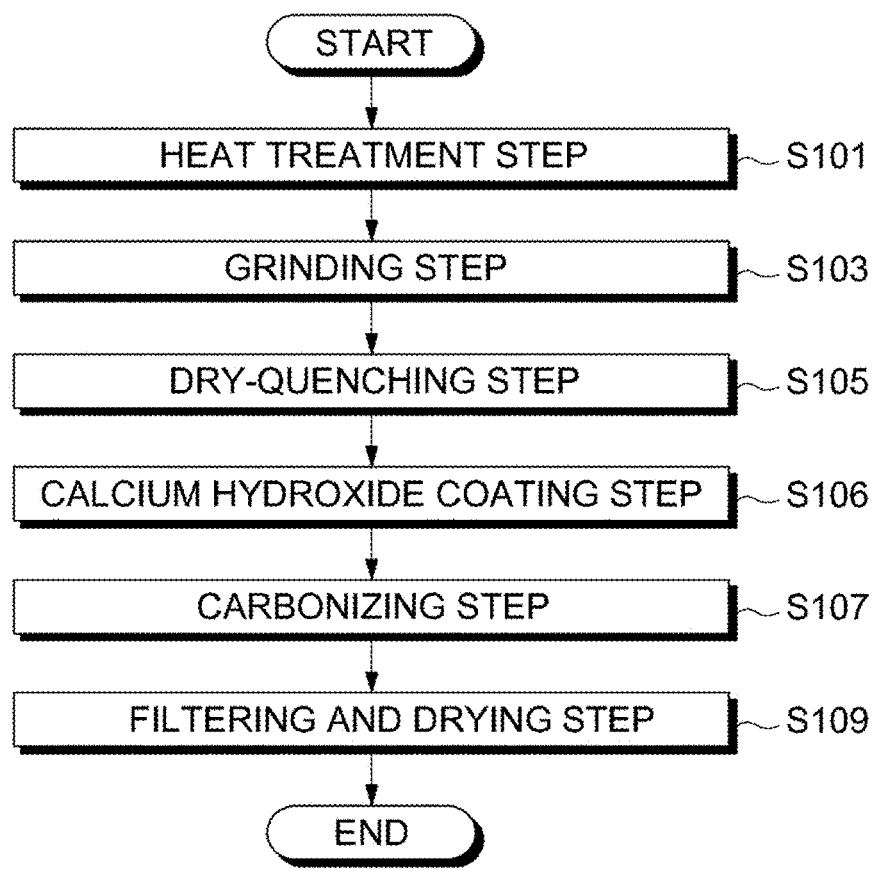
FIG. 2 is a flow chart showing a method for producing precipitated calcium carbonate using fowl egg shells according to another embodiment of the present invention.

S101: HEAT TREATMENT STEP
S103: GRINDING STEP
S105: DRY-QUENCHING STEP
S106: CALCIUM HYDROXIDE COATING STEP
S107: CARBONIZING STEP
S109: FILTERING AND DRYING STEP

BEST MODE FOR CARRYING OUT THE INVENTION

Hereinafter, a detailed description will be given as to the preferred embodiments of the present invention and the properties of the individual components, which are provided for the purpose of illustration as an example of the present invention and not intended to limit the scope of the present invention.

The method for producing precipitated calcium carbonate using fowl egg shells according to the present invention comprises: a heat treatment step S101 of heating fowl egg shells; a grinding step S103 of grinding calcium oxide generated in the heat treatment step S101; a dry-quenching step S105 of feeding the ground calcium oxide into a thermo-hygrostat to convert the ground calcium oxide into dry calcium hydroxide powder; a carbonizing step S107 of mixing the dry calcium hydroxide powder prepared in the dry-quenching step S105 with an organic solvent and feeding carbon dioxide generated in the heat treatment step S101 into the mixture; and a filtering and drying step S109 of filtering and drying the calcium carbonate obtained in the carbonizing step S107.

The heat treatment step S101 is a step of heating fowl egg shells, such as heating fowl egg shells at 580 to 780° C. for 1 to 60 minutes. The heat treatment for fowl egg shells does not need pretreatment processes, such as washing, grinding, sorting, and iron leaching, that are typically carried out in the heat treatment process for limestone. For the heat treatment of fowl egg shells, the fowl egg shells are removed of the remaining white and yolk and then heated at the above-defined temperature for the defined period of time using a fire plate [ 미설명 ] which is 2 cm deep and 20 cm in diameter, so they are converted into calcium oxide.

Fowl egg shells are composed of calcite as a principal component and rarely contain impurities, such as dolomite, iron oxide, silicon oxide, or aluminum oxide, leading to production of calcium carbonate with high dignity and high quality. The reason that the fowl egg shells are not ground in the heat treatment step S101 is that when the fowl egg shells made up of porous thin membranes are ground, the powders of the ground fowl egg shells are laminated to make the space between them narrower, leading to deterioration in the heat transfer and making it difficult to discharge carbon dioxide, which increases the partial pressure of carbon dioxide on the surface of the powders of the fowl egg shells where thermal dissociation occurs, lowering the thermal dissociation rate and thus creating a need for raising the heat dissociation temperature.

Further, the fowl egg shells contain organic matrix that does not exist in limestone and have a great increase in the number of openings due to combustion of organic substances and vaporization of water during the heat treatment process, which openings cause an increase in the discharge rate of carbon dioxide. In this regard, the carbon dioxide discharged is separately collected and fed to the calcium hydroxide mixed with an organic solvent in the carbonizing step S107.

Further, the fowl egg shells are made up of porous thin membranes, so the reactivity and activity are highest when the heat treatment is carried out at a temperature of 700° C. or below for 10 minutes or less. It can be seen from the SEM images of FIGS. 3 and 4 that the higher heat treatment temperature leads to a reduction in the particle pores and causes fusion to proceed to deteriorate reactivity and activity.

The grinding step S103 is a step of grinding the calcium oxide produced in the heat treatment step S101. The grinding step is achieved by using one grinding apparatus selected from the group consisting of ball mill, disc mill, and impact mill. In the case of the grinding step using a ball mill, the ball is preferably made of aluminum oxide or zirconium oxide, because the use of a ball made of iron may cause a secondary contamination with iron powder.

The dry-quenching step S105 is a step of feeding the ground calcium oxide from the grinding step S103 into a thermo-hygrostat to convert the ground calcium oxide into dry calcium hydroxide powder. In the dry-quenching step, the ground calcium oxide is exposed to the atmospheric air for 1 to 15 days to absorb moisture, and the moisture-containing calcium oxide is placed into a thermo-hygrostat maintained in the humidity range of 30 to 95% for 3 to 120 minutes to convert the calcium oxide into dry calcium hydroxide powder.

In this regard, exposing the ground calcium oxide to the atmospheric air for 1 to 15 days increases the yield of calcium hydroxide, so the calcium oxide can be converted into dry calcium hydroxide powder in a short period of time in the thermo-hygrostat. Such a dry-quenching step S105 does not involve an exothermic reaction in the course of the reaction, making it possible to realize a quantitative reaction. Further, unlike liquids such as the conventional cream of lime that are great in volume and specific gravity, the dry calcium hydroxide powder contributes to convenient workability and enables the control of the reaction temperature using a water bath or a chiller with efficiency.

The carbonizing step S107 is a step of mixing the calcium hydroxide prepared in the dry-quenching step S105 with an organic solvent and then feeding the carbon dioxide generated from the heat treatment step S101. In the carbonizing step S107, 2 to 25 parts by weight of the calcium hydroxide prepared in the dry-quenching step S105 and 95 to 100 parts by weight of an organic solvent are put into a reactor, and the carbon dioxide generated in the heat treatment step is fed into the reactor at a rate of 450 to 550 cc/min, where an agitator provided in the reactor is rotated at a speed of 450 to 550 rpm.

In this regard, the organic solvent includes at least one selected from the group consisting of methanol, ethanol, and water. Feeding the carbon dioxide generated from the heat treatment step S101 into the reactor can prevent possible environmental contamination caused by carbon dioxide.

The filtering and drying step S109 is a step of filtering and drying the calcium carbonate prepared in the carbonizing step S107. In the filtering and drying step S109, the precipitated calcium carbonate prepared in the carbonizing step S107 is filtered through a rotary atomizer ['원심회전분부기(○) '] and then dried with a hot-air drier.

More preferably, the calcium carbonate in the liquid state is transferred to a storage tank, subjected to continuous centrifugal agitation to prevent precipitation, sprayed into a drying chamber through a rotary atomizer, and then dried with a hot-air drier provided in a drying chamber.

In this regard, the hot-air drier is preferably a drier using a drying method based on electric heating, direct firing with gas, steam heating, or hot-oil heating.

Through the filtering and drying step, the particle size becomes considerably uniform in the range of 0.01 to 1 micrometer to produce precipitated calcium carbonate with high purity using fowl egg shells.

The method may further comprise a calcium hydroxide coating step S106 of forming a coating on the surface of the dry calcium hydroxide powder of the dry-quenching step S105, between the dry-quenching step S105 and the carbonizing step S107. In the calcium hydroxide coating step S106, 25 parts by weight of the dry calcium hydroxide powder, 25 to 50 parts by weight of distilled water, 25 to 50 parts by weight of methanol, 1 to 5 parts by weight of a rubber component, and 1 to 5 parts by weight of an agar liquid are fed into a high-pressure reactor. The mixture is stirred in the supercritical region under conditions of 32° C. and 74 bar for 30 minutes and then filtered through a 300-to-400 mesh sieve.

In this regard, the rubber component is preferably tragacanth gum ['트라칸트 고무'] or raw cast bean rubber ['로우캐스트빈 고무'], and the agar liquid is prepared by heating agar in water bath at 100° C. for 10 hours.

Through the calcium hydroxide coating step S106, the precipitated calcium carbonate prepared using the surface-coated dry calcium hydroxide has an average particle size of 0.1 micrometer or less without causing agglomeration.

Hereinafter, a description will be given as to the method for producing precipitated calcium carbonate using fowl egg shells according to the present invention and the properties of the precipitated calcium carbonate prepared by the method with reference to the following examples.

Example 1

Fowl egg shells not removed of white and yolk and not ground are heated on a fire plate at 600° C., 700° C., and 1,000° C. for 10 minutes, 30 minutes, and 60 minutes to yield calcium oxide.

Comparative Example 1

Fowl egg shells removed of white and yolk and then ground in a size of 100 to 325 mesh are heated on a fire plate at 600° C., 700° C., and 1,000° C. for 10 minutes, 30 minutes, and 60 minutes to yield calcium oxide.

Comparative Example 2

68 parts by weight of fowl egg shells removed of white and yolk and then ground in a size of 50 to 325 mesh are mixed with 2 parts by weight of polyethylene glycol and 30 parts by weight of water. The mixture is compression-molded into a honeycomb-shaped mould with a partition wall having a thickness of 2 cm and an opening having a diameter of 0.5 cm. The mould is then heated on a fire plate at 600° C., 700° C., and 1,000° C. for 10 minutes, 30 minutes, and 60 minutes to yield calcium oxide.

Comparative Example 3

65 parts by weight of fowl egg shells removed of white and yolk are mixed with 5 parts by weight of sawdust, and 30 parts by weight of water. The mixture is compression-molded into a rod-shaped mould. The mould is then heated on a fire plate at 600° C., 700° C., and 1,000° C. for 10 minutes, 30 minutes, and 60 minutes to yield calcium oxide.

Figure 3:
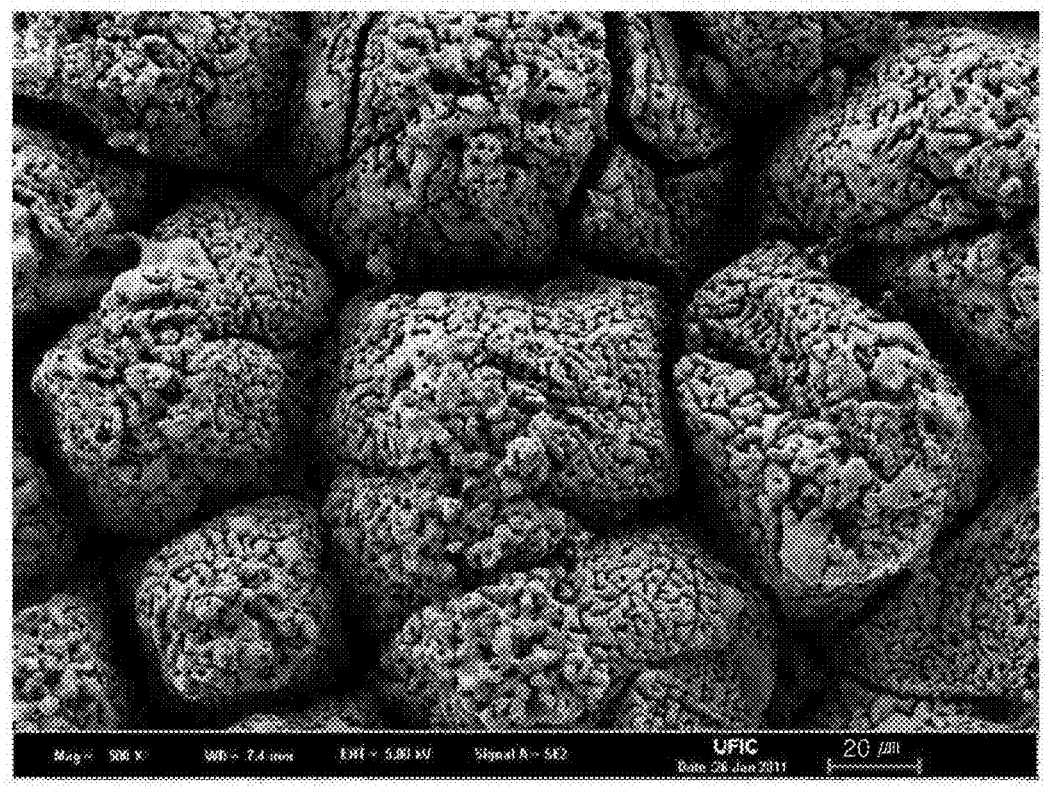
FIG. 3 is an SEM image showing calcium carbonate prepared in Example 1 and subjected to heat treatment at 700° C. for 10 minutes.
Figure 4:
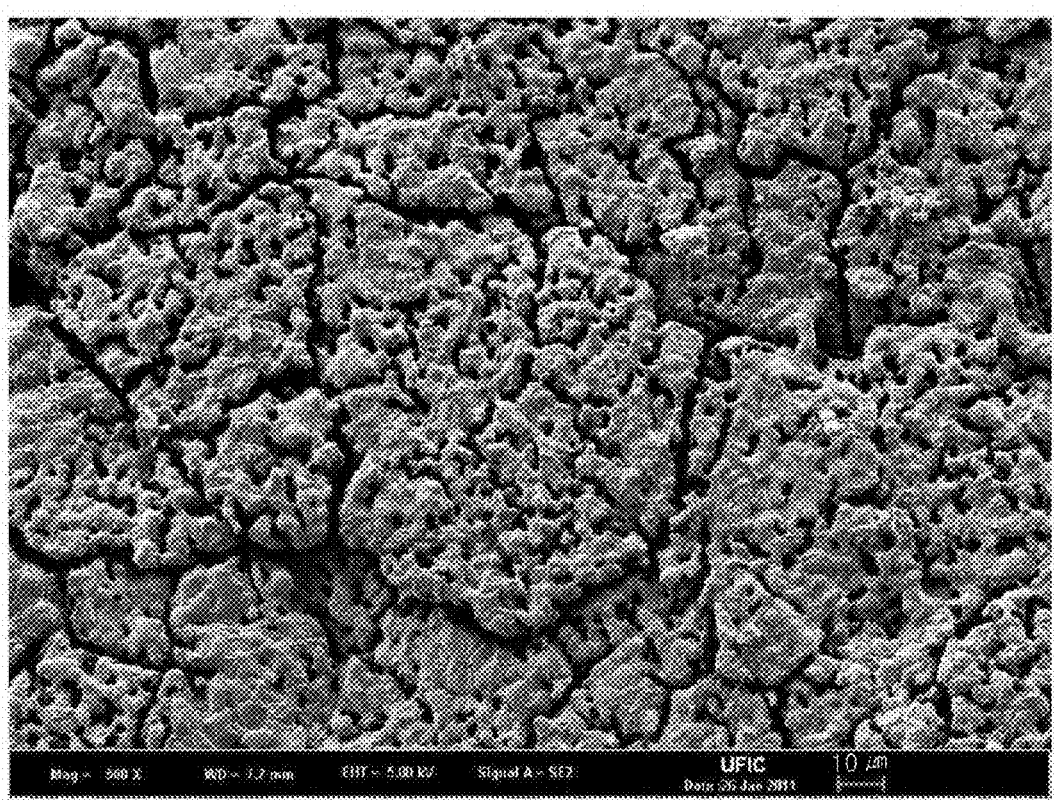
FIG. 4 is an SEM image showing calcium carbonate prepared in Example 1 and subjected to heat treatment at 1,000° C. for 10 minutes.

SEM images are taken of the calcium oxide heat-treated at 700° C. for 10 minutes and the calcium oxide heat-treated at 1,000° C. for 10 minutes in the Example 1 and presented in FIGS. 3 and 4, respectively.

Compared with the calcium oxide heated at 700° C. as shown in FIG. 3, the calcium oxide heated at 1,000° C. is converted into a structure with a less number of porous particle pores as shown in FIG. 4 and lower reactivity and activity due to occurrence of fusion.

The calcium oxides prepared in Example 1 and Comparative Examples 1, 2 and 3 are measured in regards to the conversion rate by way of XRD (X-Ray Diffraction). The measurement results are presented in Table 1.

TABLE 1

| | Test Conditions | | |
| --- | --- | --- | --- |
| Div. | Heat treatment temperature (° C.) | Heat treatment time (min) | Conversion rate (%) |
| Example 1 | 600 | 10 | 58 |
| | | 30 | 79 |
| | | 60 | 100 |

TABLE 1-continued

| Div. | Test Conditions | | |
|---|---|---|---|
| | Heat treatment temperature (° C.) | Heat treatment time (min) | Conversion rate (%) |
| Comparative Example 1 | 600 | 10 | 13 |
| | | 30 | 21 |
| | | 60 | 29 |
| Comparative Example 2 | 600 | 10 | 47 |
| | | 30 | 67 |
| | | 60 | 71 |
| Comparative Example 3 | 600 | 10 | 21 |
| | | 30 | 35 |
| | | 60 | 52 |
| Example 1 | 700 | 10 | 100 |
| | | 30 | 100 |
| | | 60 | 100 |
| Comparative Example 1 | 700 | 10 | 27 |
| | | 30 | 53 |
| | | 60 | 67 |
| Comparative Example 2 | 700 | 10 | 64 |
| | | 30 | 81 |
| | | 60 | 92 |
| Comparative Example 3 | 700 | 10 | 64 |
| | | 30 | 77 |
| | | 60 | 90 |
| Example 1 | 1,000 | 10 | 100 |
| | | 30 | 100 |
| | | 60 | 100 |
| Comparative Example 1 | 1,000 | 10 | 67 |
| | | 30 | 81 |
| | | 60 | 100 |
| Comparative Example 2 | 1,000 | 10 | 70 |
| | | 30 | 89 |
| | | 60 | 100 |
| Comparative Example 3 | 1,000 | 10 | 68 |
| | | 30 | 89 |
| | | 60 | 100 |

As can be seen from Table 1, the fowl egg shells removed of white and yolk show high conversion rate into calcium oxide at low temperature when they are not ground.

Example 2

Out of the calcium oxides prepared in Example 1, the calcium oxide with conversion rate of 100% is exposed to the atmospheric air for 7 days to absorb moisture and then placed in a thermo-hygrostat maintained at humidity of 60% for 120 minutes to prepare dry calcium hydroxide powder.

3 to 10 parts by weight of the dry calcium hydroxide powder prepared in Example 2 and 90 to 97 parts by weight of methanol are fed into a reactor having a capacity of 1 to 20 L and then reacted with carbon dioxide. The required time to yield precipitated calcium carbonate is produced is measured and presented in Table 2.

(In this regard, the required time to yield precipitated calcium carbonate is measured based on the completion time of the reaction when the pH value changes from 11 at the start of the reaction to 7 or less; and the samples are analyzed through XRD.)

TABLE 2

| Capacity of reactor (L) | Added amount of calcium hydroxide (part by weight) | Reaction temp. (° C.) | $CO_2$ flux (cc/min) | RPM of agitator (rpm/min) | Required reaction time (min) |
|---|---|---|---|---|---|
| 1 | 3 | 15 | 500 | 500 | 2 |
| | 3 | 30 | 500 | 500 | 11 |
| | 10 | 30 | 500 | 500 | 30 |
| 2 | 3 | 7 | 500 | 500 | 3 |
| | 10 | 15 | 500 | 500 | 3 |
| | 3 | 60 | 500 | 500 | 8 |
| | 10 | 40 | 500 | 500 | 27 |
| 4 | 3 | 40 | 500 | 500 | 17 |
| | 10 | 40 | 500 | 500 | 52 |
| | 20 | 40 | 500 | 500 | 161 |
| 5 | 10 | 40 | 500 | 500 | 59 |
| 10 | 10 | 40 | 500 | 500 | 61 |
| 16 | 10 | 40 | 500 | 500 | 62 |
| 18 | 10 | 40 | 500 | 500 | 66 |
| 19 | 10 | 40 | 500 | 500 | 72 |
| 20 | 10 | 40 | 500 | 500 | 74 |

As can be seen from Table 2, the required time to yield precipitated calcium carbonate decreases when using 3 parts by weight of the dry calcium hydroxide powder at lower reaction temperature in a reactor with less capacity.

Example 3

3 parts by weight of the dry calcium hydroxide powder prepared in Example 2 and 97 parts by weight of methanol are put in a 1 L reactor at 20° C. and reacted with carbon dioxide fed at a rate of 500 cc/min while the reactor is agitated at 500 rpm. After completion of the reaction, the calcium carbonate in the liquid state is transferred to a storage tank, subjected to continuous centrifugal agitation, sprayed into a drying chamber through a rotary atomizer, and then dried with a hot-air drier provided in a drying chamber to prepare precipitated calcium carbonate.

Comparative Example 4

25 parts by weight of the dry calcium hydroxide powder prepared in Example 2 and 75 parts by weight of methanol are put in a 1 L reactor at 40° C. and reacted with carbon dioxide fed at a rate of 500 cc/min while the reactor is agitated at 1,000 rpm. After completion of the reaction, the calcium carbonate in the liquid state is transferred to a storage tank, subjected to continuous centrifugal agitation, sprayed into a drying chamber through a rotary atomizer, and then dried with a hot-air drier provided in a drying chamber to prepare precipitated calcium carbonate.

Figure 5:
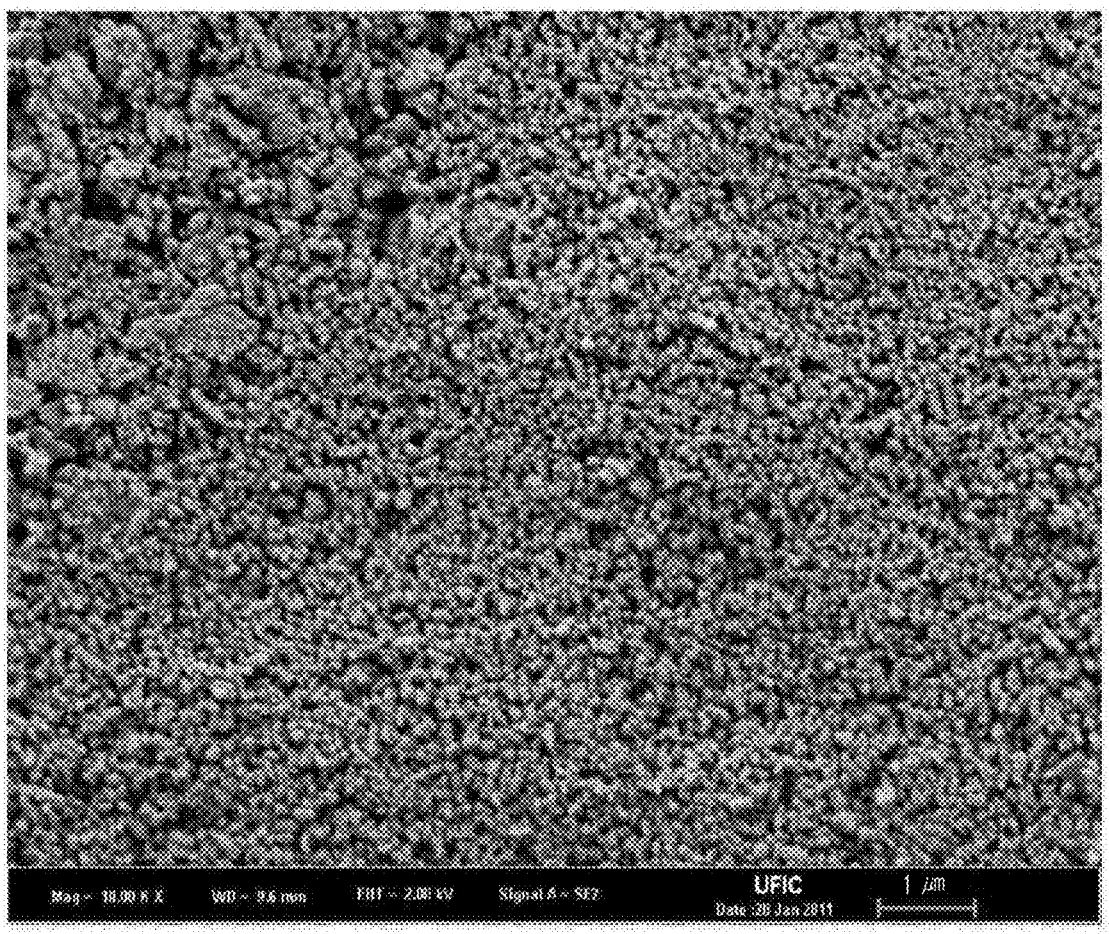
FIG. 5 is an SEM image showing particles of precipitated calcium carbonate prepared in Example 3 of the present invention.
Figure 6:
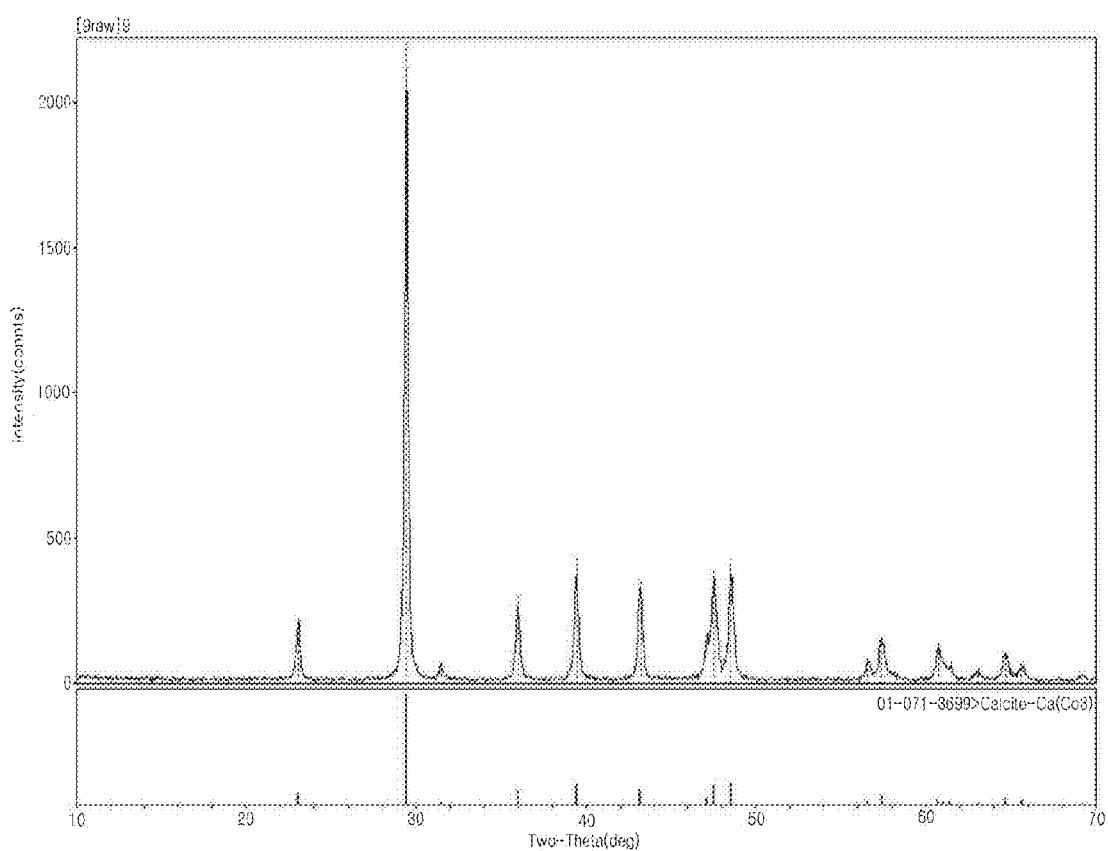
FIG. 6 is an XRD image of precipitated calcium carbonate prepared in Example 3 of the present invention.
Figure 7:
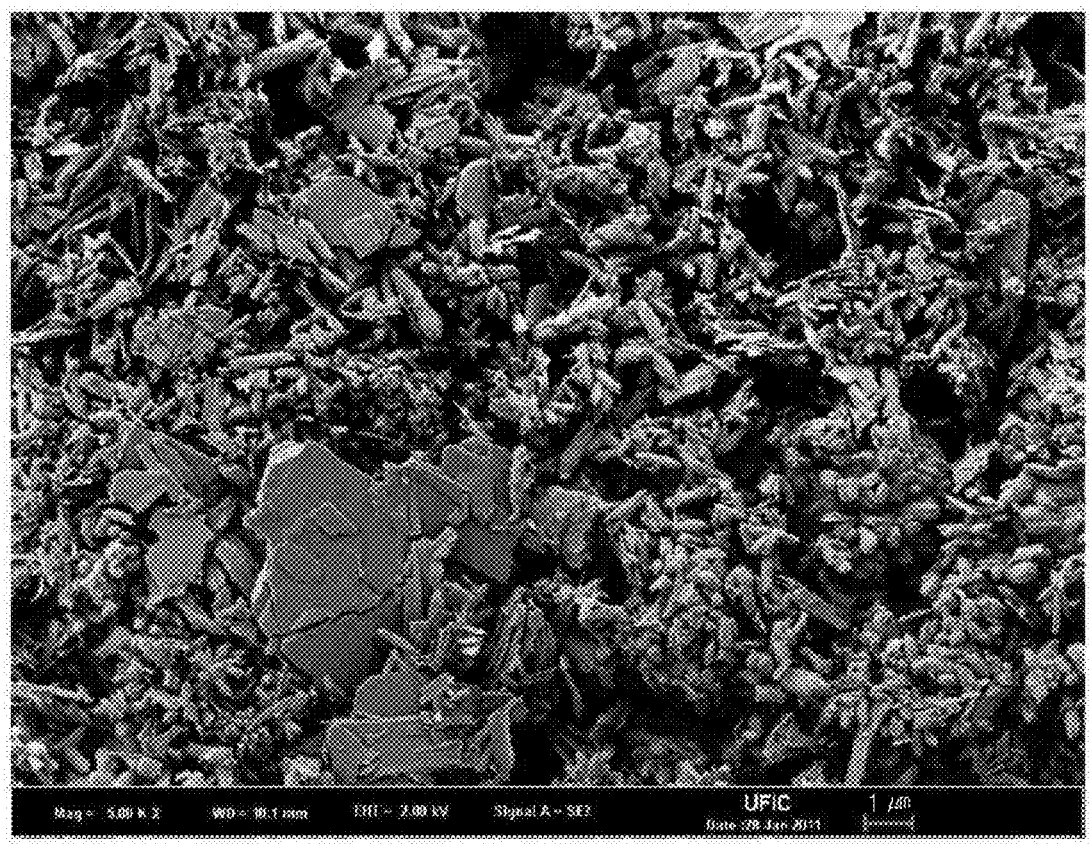
FIG. 7 is an SEM image showing particles of precipitated calcium carbonate prepared in Comparative Example 4.
Figure 8:
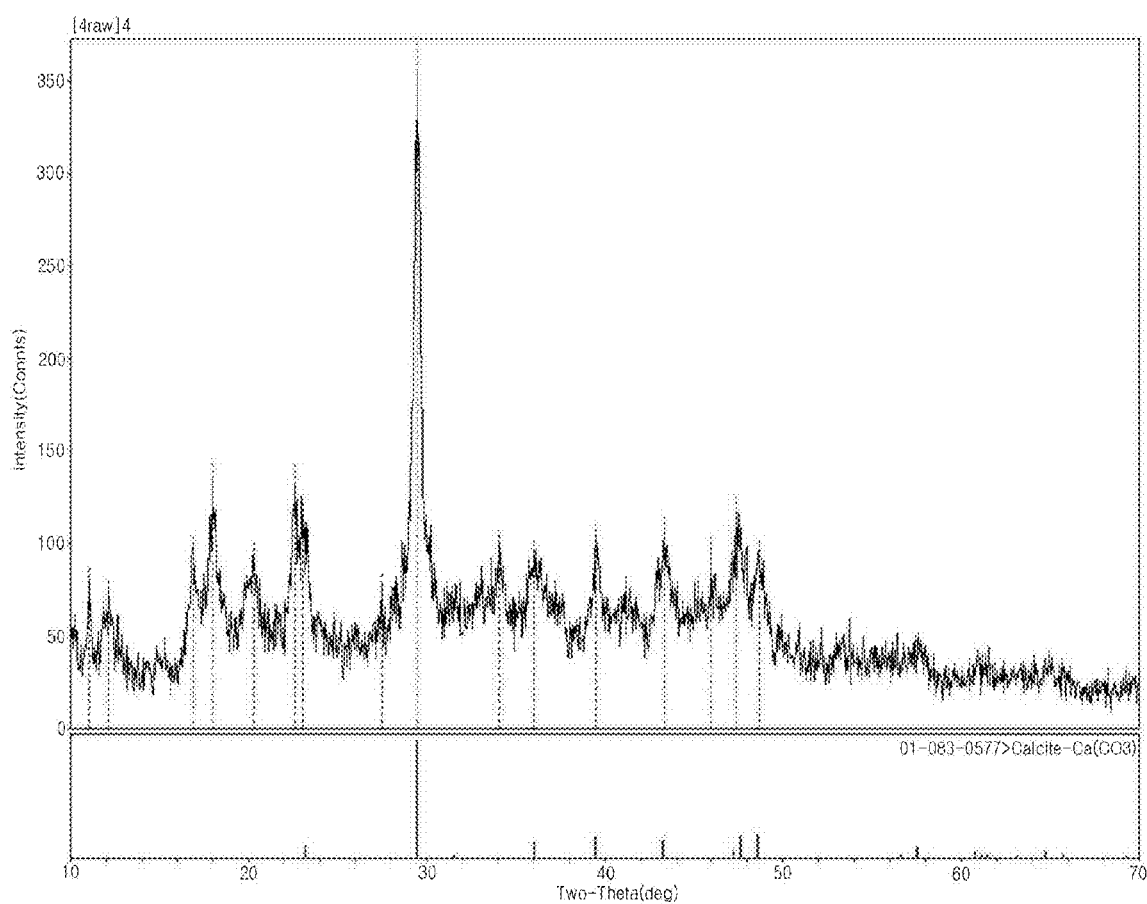
FIG. 8 is an XRD image of precipitated calcium carbonate prepared in Comparative Example 4.

SEM and XRD images are taken of the precipitated calcium carbonate prepared in Example 3 and presented in FIGS. 5 and 6, respectively. Also, SEM and XRD images are taken of the precipitated calcium carbonate prepared in Example 4 and presented in FIGS. 7 and 8, respectively.

As shown in FIGS. 5 to 8, the precipitated calcium carbonate prepared in Example 3 has an average particle size of 0.1 micrometer or less without agglomeration, while the precipitated calcium carbonate prepared in Comparative Example 4 has an average particle size of 1 to 4 micrometers with agglomeration.

Example 4

25 parts by weight of the dry calcium hydroxide powder prepared in Example 2, 35 parts by weight of distilled water, 35 parts by weight of methanol, 2.5 parts by weight of tragacanth gum, and 2.5 parts by weight of an agar liquid prepared in water bath at 100° C. for 10 hours are put into a high-pressure reactor, stirred in the supercritical region under a raised temperature of 32° C. and a pressure of 74 bar for 30 minutes, and then filtered through a 325-mesh sieve to yield calcium hydroxide. 25 parts by weight of the calcium hydroxide and 75 parts by weight of methanol are put into a 1 L reactor at 15° C. and reacted with carbon dioxide fed at a rate of 500 cc/min while the reactor is rotated at 500 rpm. After completion of the reaction, the calcium carbonated in the liquid state is transferred to a storage tank, subjected to continuous centrifugal agitation, sprayed into a drying chamber through a rotary atomizer, and then dried with a hot-air drier provided in a drying chamber to prepare precipitated calcium carbonate.

Figure 9:
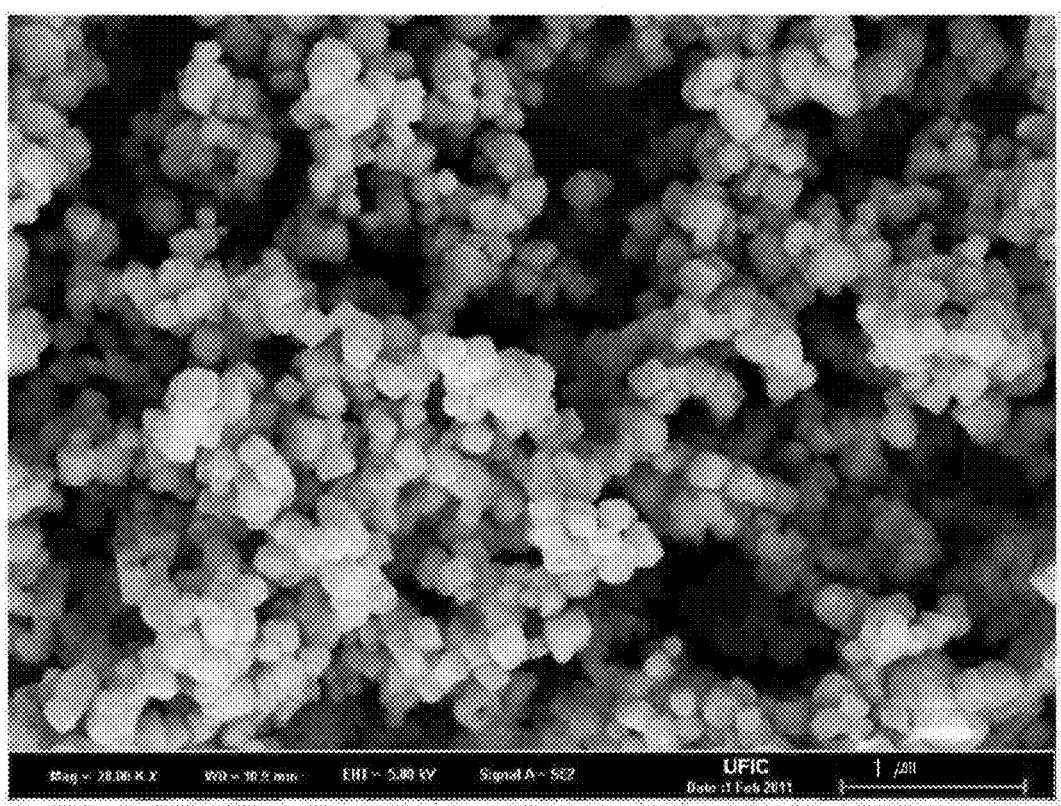
FIG. 9 is an SEM image showing precipitated calcium carbonate prepared in Example 4.
Figure 10:
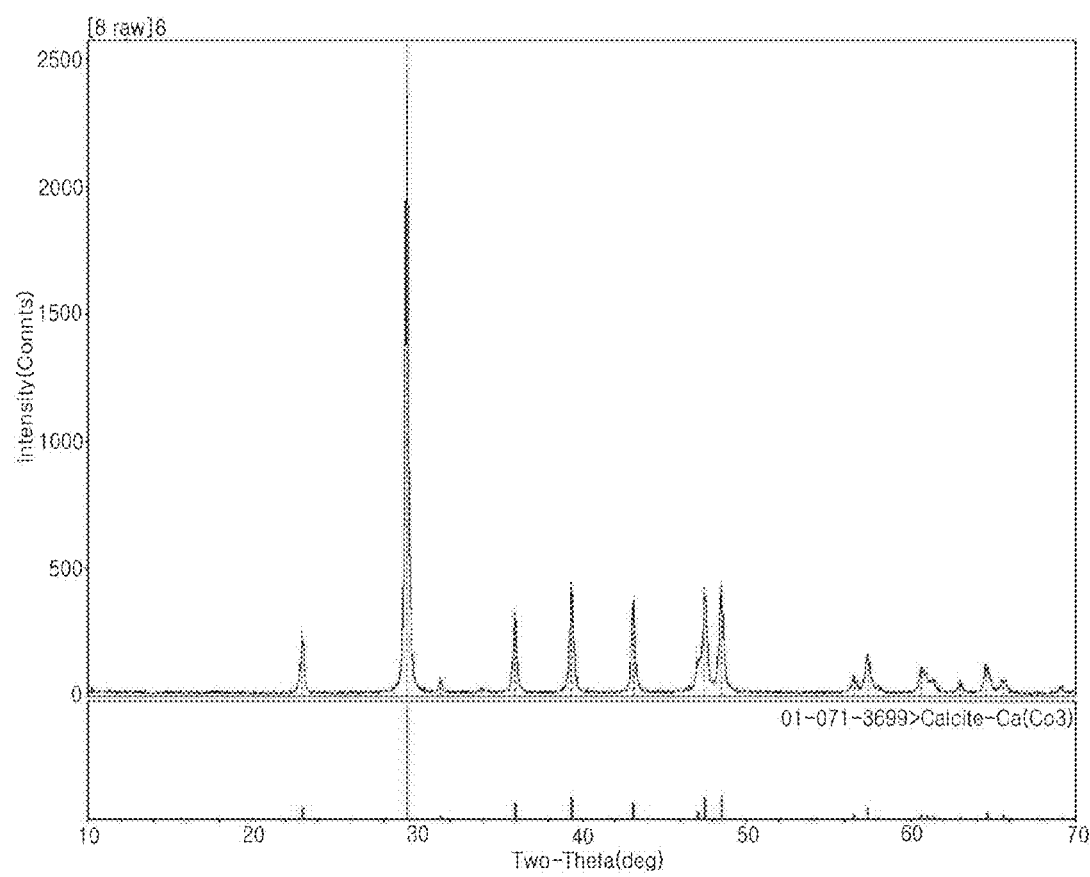
FIG. 10 is an XRD image of precipitated calcium carbonate prepared in Example 4.

SEM and XRD images are taken of the precipitated calcium carbonate prepared in Example 4 and presented in FIGS. 9 and 10, respectively.

As shown in FIGS. 9 and 10, the precipitated calcium carbonate prepared in Example 4 has collision between particles because of high solid/liquid ratio during the pretreatment process in the supercritical region. The crystal fragments cause secondary nucleation, so the increased number of nucleus leads to the reduced size of the crystals. The tragacanth gum and the agar liquid form a coating on the exterior of the reduced particles.

In addition, the precipitated calcium carbonate when prepared from the coated calcium hydroxide has a uniform average particle size of 0.1 micrometer or less without agglomeration, due to the coating even after the reaction with a high content of calcium hydroxide.

The invention claimed is:

1. A method for producing precipitated calcium carbonate using fowl egg shells, comprising:
   a heat treatment step of heating fowl egg shells;
   a grinding step of grinding calcium oxide generated in the heat treatment step;
   a dry-quenching step of feeding the ground calcium oxide to atmospheric air for 1 to 15 days to absorb moisture and thereby increase the yield of calcium hydroxide and then feeding the calcium oxide into a thermo-hygrostat to convert the ground calcium oxide into dry calcium hydroxide powder;
   a carbonizing step of mixing the dry calcium hydroxide powder prepared in the dry-quenching step with an organic solvent and feeding carbon dioxide generated in the heat treatment step into the mixture; and
   a filtering and drying step of filtering and drying the calcium carbonate obtained in the carbonizing step.

2. The method for producing precipitated calcium carbonate using fowl egg shells as claimed in claim 1, wherein the heat treatment step includes heating the fowl egg shells at 580 to 780° C. for 1 to 60 minutes.

3. The method for producing precipitated calcium carbonate using fowl egg shells as claimed in claim 1, wherein the grinding step is achieved by using one grinding apparatus selected from the group consisting of ball mill, disc mill, and impact mill.

4. The method for producing precipitated calcium carbonate using fowl egg shells as claimed in claim 1, wherein the dry-quenching step includes feeding the calcium oxide into a thermo-hygrostat maintained at humidity 30 to 95% for 30 to 120 minutes to convert the calcium oxide into dry calcium hydroxide powder.

5. The method for producing precipitated calcium carbonate using fowl egg shells as claimed in claim 1, wherein the carbonizing step includes feeding 2 to 25 parts by weight of the dry calcium hydroxide powder and 75 to 100 parts by weight of an organic solvent into a reactor and then adding the carbon dioxide generated from the heat treatment step into the reactor at a rate of 450 to 550 cc/min.

6. The method for producing precipitated calcium carbonate using fowl egg shells as claimed in claim 1, wherein the drying and filtering step includes filtering the precipitated calcium carbonate generated from the carbonizing step through a rotary atomizer and then drying with a hot-air drier.

7. The method for producing precipitated calcium carbonate using fowl egg shells as claimed in claim 1, wherein the method further comprises a calcium hydroxide coating step between the dry-quenching step and the carbonizing step, wherein the calcium hydroxide coating step includes feeding 25 parts by weight of the dry calcium hydroxide powder produced in the dry-quenching step, 25 to 50 parts by weight of distilled water, 25 to 50 parts by weight of methanol, 1 to 5 parts by weight of a rubber component, and 1 to 5 parts by weight of an agar liquid into a high-pressure reactor, stirring in the supercritical region under conditions of 32° C. and 74 bar for 30 minutes, and then filtering through a 300-to-400 mesh sieve.

* * * * *